E. BECKER AND R. SUCHOPAREK.
PROCESS AND APPARATUS FOR THE MANUFACTURE OF CRANK SHAFTS.
APPLICATION FILED NOV. 29, 1920.

1,414,108.  Patented Apr. 25, 1922.

Inventors.
E. Becker.
R. Suchopárek.
By H. R. Kerslake.
Atty.

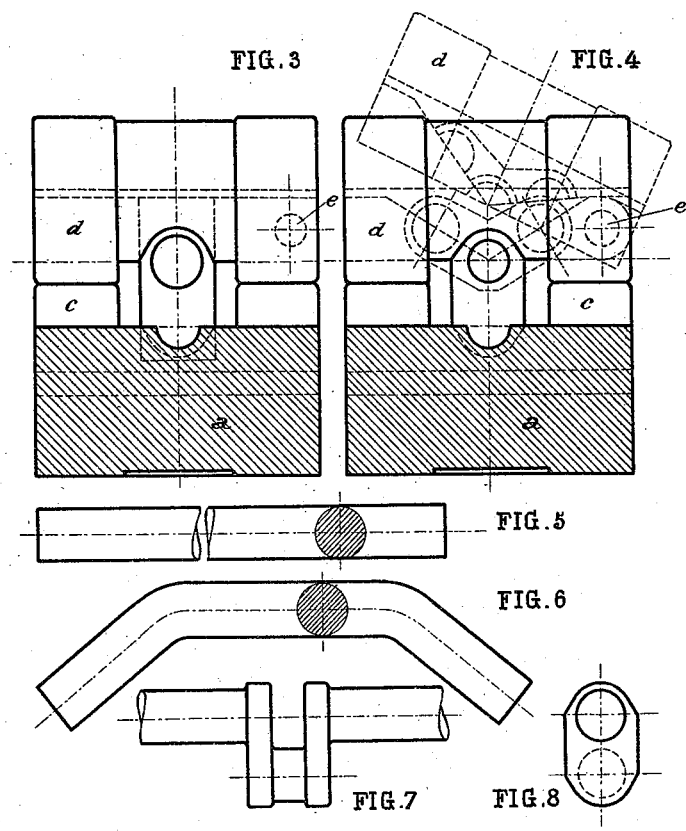

UNITED STATES PATENT OFFICE.

ERICH BECKER, OF KLADNO, GERMANY, AND RUDOLF SUCHOPÁREK, OF KROCIHLAVY, NEAR KLADNO, CZECHO-SLOVAKIA.

PROCESS AND APPARATUS FOR THE MANUFACTURE OF CRANK SHAFTS.

1,414,108. Specification of Letters Patent. Patented Apr. 25, 1922.

Application filed November 29, 1920. Serial No. 427,197.

(GRANTED UNDER THE PROVISIONS OF THE ACT OF MARCH 3, 1921, 41 STAT. L., 1313.)

*To all whom it may concern:*

Be it known that we, Dr. ERICH BECKER, of Kladno, and RUDOLF SUCHOPÁREK, of Krocihlavy, near Kladno, Czecho-Slovakia, citizens of Germany and Czecho-Slovakia, respectively, have invented new and useful Improvements in the Processes and Apparatuses for the Manufacture of Crank Shafts, (for which we have filed an application in Austria Oct. 25, 1918; Germany, Nov. 12, 1918, Patent No. 318,250; Czecho-Slovakia, May 15, 1920; England, July 19, 1920; France, July 19, 1920; Switzerland, July 21, 1920; Hungary, July 19, 1920; Italy, July 21, 1920, and the Netherlands, July 19, 1920,) of which the following is a specification.

This invention relates to a process of and apparatus for the manufacture of crank shafts, the invention being equally applicable to crank shafts having one or more cranks formed thereon and independent of whether the cranks are coplanar or in different planes.

It has already been proposed to produce crank shafts by a process which consists in forcing a male die into a steel matrix of suitable thickness for producing the crank while the crank webs are formed by two jaws or cheeks which are caused to move at right angles to the axis of the shaft.

The steel bar constituting the blank may be of approximately the finished length of the shaft since it is not shortened by the pressing operation but the process is subject to the disadvantage that the fibre of the material is torn away and displaced and does not extend parallel to the longitudinal sides of the crank webs.

It has also been proposed to produce crank shafts by exerting an axial pressure upon the end surface of a round bar of steel of determined length whilst simultaneously a male die is employed to bend the shaft in a direction at right angles to the axial direction. In this case the length of the steel bar is equal to the length of the developed shaft but the process, apart from the fact that only single crank shafts can be made thereby, suffers from the disadvantage that owing to the drawing of the outer fibres no sharp edges can be formed whilst the inner fibres are crushed and folded.

Moreover, in both the above processes the blank must have a cross-section which is a multiple of the cross-section of the shaft journal or of the crank pin cross section, and in consequence expensive machine operations must be undertaken to produce the finished shaft with a consequent uneconomical employment of material.

The object of the present invention is to provide a process which will be free from the disadvantages noted above, and the invention consists in a process for forming crank shafts which consists in simultaneously bending and upsetting the blank in order to produce the crank and crank webs in a single operation.

According to this process, therefore, the length of the blank must be longer than the length of the developed crank shaft but the cross section of the whole of the blank may be equal to the smallest cross section present in the finished crank shaft, and the amount of material needed for producing the crank shaft is therefore reduced to a minimum.

Furthermore, by a process in accordance with the invention the collars or shoulders projecting from the shaft at the shaft journals and crank pins may be formed with sharp edges so that they need not be machined from the solid.

The crank webs may be formed parallel so that they can also be left in the rough in which case it is necessary merely to give a finished cut in the lathe to the crank pins and shaft journals which may be provided with a small excess of material for this purpose.

A still further advantage of the invention lies in the fact that the fibre in the crank webs is parallel with the edges thus providing the maximum security under any conditions of working.

The accompanying drawings illustrate more or less diagrammatically one mode of carrying out the invention.

Figures 3 and 4 are cross-sectional views of the apparatus, the left-hand crank web being shown in elevation in Figure 3 and the right-hand crank web in Figure 4 whilst in both figures the upper part with the male die is omitted.

Figure 5 is a view showing the steel bar which constitutes the blank.

Figure 6 is a view showing the bar as bent.

Figures 7 and 8 are respectively front and side elevations of the finished crank.

In carrying our invention into effect in one convenient manner we form our apparatus with a lower part $a$, an upper part $b$ having a concave under surface and carrying at its centre the male die $f$, and two jaws each of which is formed in two parts such as $c$ and $d$.

The upper jaw parts $d$ are pivotally connected to the lower parts $c$ as, for example, by means of a pin $e$ in such a manner that the jaw members may be opened out by pivoting the same about the pins $e$, the upper jaw being shown partly open in the dot and dash line of Figure 4.

The jaws are mounted on the lower part $a$ in such a manner that they are capable of rotating in the direction of the axis of the shaft and the upper surfaces of the jaws are shaped to conform to the concave under surface of the upper part $b$. One of the jaws (Figure 4) may have recesses formed therein in order that when a multiple crank shaft is to be produced the cranks and flanges already formed may be suitably arranged in position as, for example, either all in one plane or angularly disposed with reference to one another in planes 120° 180° or other desired angle apart.

Figure 1:
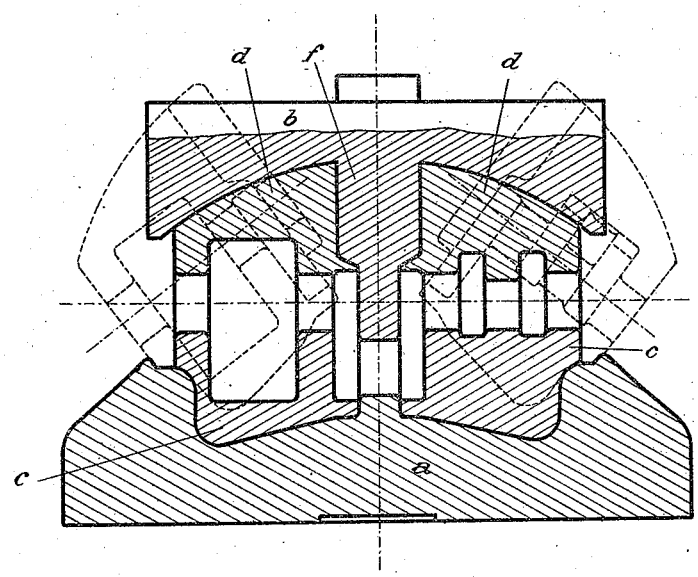
Figure 1 is a longitudinal section showing one convenient form of apparatus in accordance with the invention.
Figure 2:
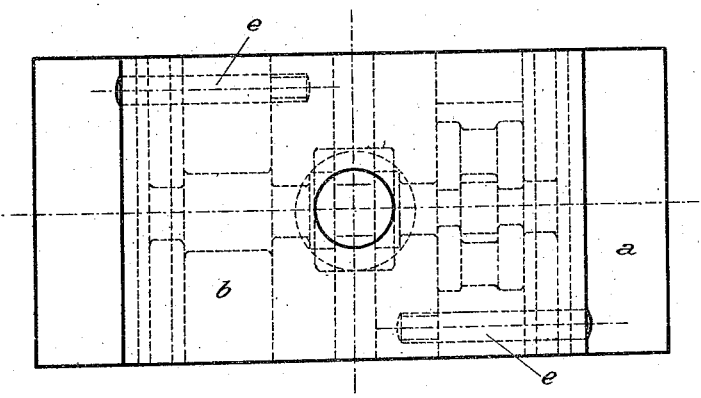
Figure 2 is a plan.

In operation the jaws are rotated outwards so that they assume the position shown in dotted lines in Figure 1 whereupon the upper jaw parts are opened out and the blank which has been bent to the form shown in Figure 6 is inserted between them and the jaws then closed.

By the subsequent downward movement of the upper part $b$ the jaw parts $c$ and $d$ are pressed so firmly together that all escape of the material in the subsequent bending and upsetting operation is prevented.

Further downward movement of the upper part causes the jaws to move towards each other until they assume the position shown in the full lines in Figure 1, thus bending the shaft to form the crank whilst simultaneously the male die $f$ upsets the crank to produce the crank webs to any required size, the shoulders or collars (limiting the journals and any desired flanges being filled out simultaneously with the filling out of the crank webs.

It is to be further noted that according to the present invention when producing six throw crank shafts such as may be required in connection with aircraft, round steel bars of 68 mm. diameter may be employed whereas according to the hitherto proposed processes for producing the same shaft of the same size it would be necessary to use a steel bar of a diameter of 180 to 200 millimetres.

The invention is not to be limited to the precise form of apparatus hereinbefore described by way of example as the means adopted for producing the combined bending and upsetting effect may be variously modified to suit any practical requirements that may have to be fulfilled.

What I claim is:—

1. A process for forming crank shafts which consists in bending a round workpiece to form elbows and simultaneously pressing out crank plates thereon.

2. An apparatus for carrying out the process defined in claim 1 comprising a male die operating to bend the elbows of the crank in the workpiece, and axially rotatable jaws cooperating with the male die adapted to firmly grip the workpiece adjacent the elbow.

3. An apparatus for carrying out the process defined in claim 1 comprising a male die operating to bend the elbows of the crank in the workpiece, and axially rotatable jaws cooperating with the male die formed to firmly grip the workpiece adjacent the elbow the engaging surfaces of the male die and jaws being correspondingly curved.

In testimony whereof we have signed our names to this specification in the presence of two subscribing witnesses.

DR. ING. ERICH BECKER.
RUDOLF SUCHOPÁREK.

Witnesses:
　ING. K. KUTHAN,
　ALOIS REPPER.